United States Patent
Becker et al.

(10) Patent No.: US 6,917,129 B2
(45) Date of Patent: Jul. 12, 2005

(54) ELECTROMECHANICAL DRIVE DEVICE

(75) Inventors: Herbert Becker, Coburg (DE); Gerhard Schelhorn, Coburg (DE); Volker Aab, Sesslach-Heiligersdorf (DE); Reiner Kurzendoarfer, Coburg (DE); Karl-Heinz Rosenthal, Karlsbad (DE)

(73) Assignee: Brose Fahrzeugteile GmbH & Co. KG., Coburg, Coburg (DE)

( * ) Notice: Subject to any disclaimer, the term of this patent is extended or adjusted under 35 U.S.C. 154(b) by 0 days.

(21) Appl. No.: 10/019,148

(22) PCT Filed: Apr. 20, 2001

(86) PCT No.: PCT/DE01/01597
§ 371 (c)(1),
(2), (4) Date: Dec. 21, 2001

(87) PCT Pub. No.: WO01/82451
PCT Pub. Date: Nov. 1, 2001

(65) Prior Publication Data
US 2003/0160526 A1 Aug. 28, 2003

(30) Foreign Application Priority Data
Apr. 22, 2000 (DE) .......................... 100 20 018

(51) Int. Cl.⁷ ................................................ H02K 7/00
(52) U.S. Cl. ................. 310/75 R; 310/71; 310/180; 310/89; 257/706; 361/304; 165/80.3
(58) Field of Search ................. 310/75 R, 71, 310/180, 89; 257/706; 361/304; 165/80.3

(56) References Cited

U.S. PATENT DOCUMENTS

| | | | | |
|---|---|---|---|---|
| 3,617,786 A | * | 11/1971 | Stieper ..................... | 310/242 |
| 3,875,438 A | * | 4/1975 | Tharman ..................... | 310/68 |
| 4,712,030 A | * | 12/1987 | Lakin ......................... | 310/98 |
| 4,857,812 A | | 8/1989 | Mochizuki et al. | |
| 5,118,903 A | | 6/1992 | Schupp et al. | |
| 5,315,194 A | * | 5/1994 | Brusasco .................... | 310/68 |
| 5,723,924 A | * | 3/1998 | Blanchet ..................... | 310/85 |
| 5,923,094 A | * | 7/1999 | Seeberger ................... | 310/9.1 |
| 5,965,239 A | | 10/1999 | Walther et al. | |
| 6,019,292 A | | 2/2000 | Walther | |
| 6,051,899 A | | 4/2000 | Walther et al. | |
| 6,291,912 B1 | | 9/2001 | Nadir et al. ................ | 310/64 |
| 6,317,332 B1 | | 11/2001 | Weber et al. ............... | 361/760 |
| 6,431,026 B1 | | 8/2002 | Walther et al. | |
| 6,707,183 B2 | * | 3/2004 | Breynaert ................. | 310/68 B |
| 6,727,613 B2 | * | 4/2004 | Kawakami ................ | 310/75 R |

FOREIGN PATENT DOCUMENTS

| | | |
|---|---|---|
| DE | 39 33 123 A1 | 4/1991 |
| DE | 42 40 754 A | 6/1994 |
| DE | 195 48 828 A1 | 1/1997 |
| DE | 19 51 455 A 1 | 8/1999 |
| DE | 198 51 455 | 8/1999 |
| DE | 198 23 376 | 11/1999 |
| EP | 0 474 904 A1 | 3/1992 |
| EP | 0 474 904 | 3/1992 |
| FR | 2 766 301 | 1/1999 |

* cited by examiner

Primary Examiner—Darren Schuberg
Assistant Examiner—Iraj A. Mohandesi
(74) Attorney, Agent, or Firm—Christie, Parker & Hale, LLP

(57) ABSTRACT

An electro-mechanical drive device for adjustment devices of a motor vehicle, more particularly for a window lifter, has a gearing with a gear housing, an electric motor mechanically connected to the gearing, a control device mounted in the gearing housing and having at least one power semi-conductor for controlling the electric motor, and means as a heat sink thermally coupled to the power semi-conductor to draw off the waste heat from the power semi-conductor. The means which as heat sink draws off the waste heat from the power semi-conductor is integrated in the gear housing. With the integration of the means for drawing off the waste heat into the gear housing it is possible for the means to undertake further mechanical or thermal functions extending beyond the function as heat sink.

20 Claims, 7 Drawing Sheets

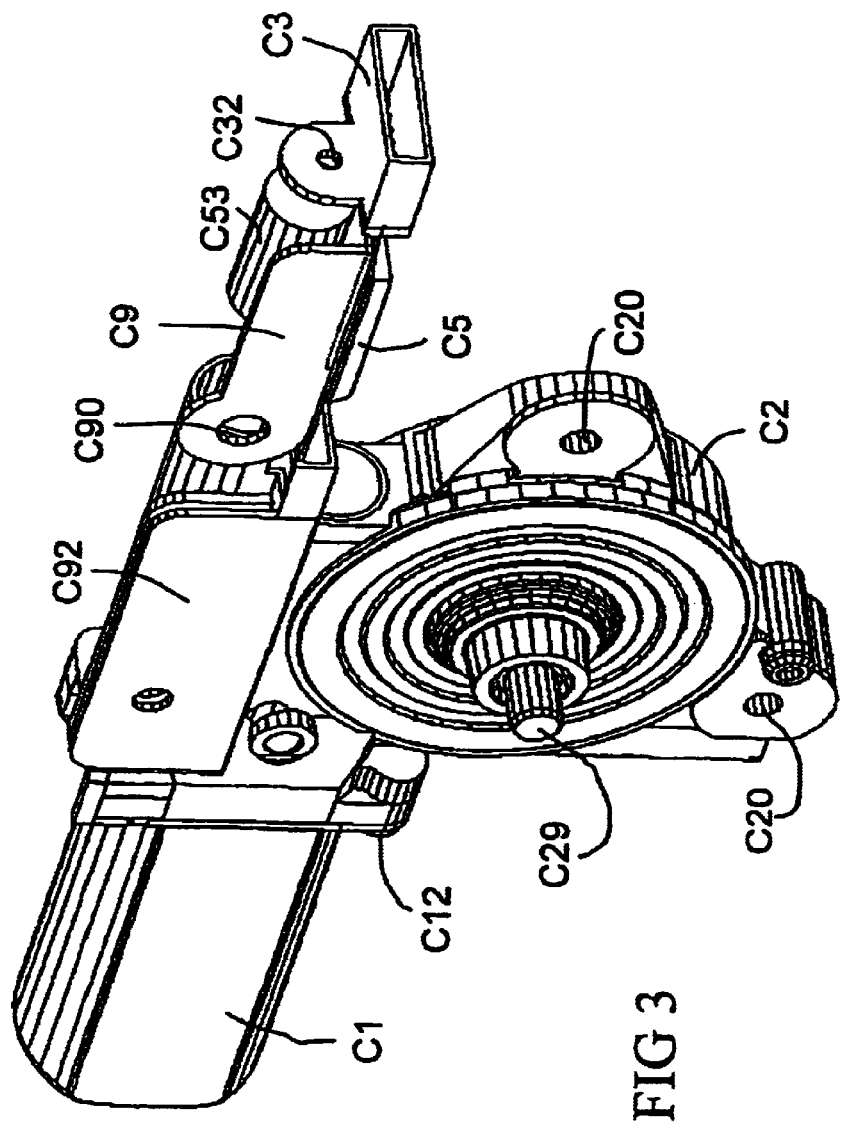

ELECTROMECHANICAL DRIVE DEVICE

FIELD OF INVENTION

The invention relates to a method for manufacturing an electro-mechanical drive device for adjustment devices in a motor vehicle, more particularly for a window lifter.

BACKGROUND

In order to raise and lower window panes in motor vehicles electro-motorized window lifters are known which are suitable for installing in the doors of motor vehicles and which have a drive device in the form of for example an electric motor with attached gearing or gear motor which can be connected to a vehicle battery through a wiring connection and switch.

The window pane which can be raised or lowered in the vehicle door through the electro-motorized window lifter is thereby fixed along its lower edge to a guide slide which can be moved up and down along a profiled rail by means of for example a closed cable loop. The cable loop runs around a cable drum which is driven for example through a worm gearing of the electric motor in a compact drive device which can have a cable drum in addition to the electric motor and worm gearing and which is fixed on the supporting parts of the inside of the vehicle door, for example a support plate, in the same way as the profiled rail.

As an alternative to this the drive device can be used to operate a cross-arm window lifter or other adjustment devices in the motor vehicle, for example a a horizontal seat adjuster.

Since different forces are required to raise and lower the window pane the electric motor is connected to a control device, a control and regulating circuit which is connected to a sensor of a measuring system for determining the speed or position of the electric motor. The control device for raising or lowering the window pane is controlled by the vehicle driver or passenger who operates the control switch.

From DE 198 51 455 A1 an electronics module is known for a drive unit which is operated by an electric motor. The electronic components are soldered onto a small plate in an electronics housing part. To control the drive unit a relay is used to switch on the current supply to the motor.

In EP 0 474 904 an electronics module as previously described is integrated in a gear housing. Also here a relay is switched on to control the current supply to the electric motor.

For future window lifter systems the torque or rotational speed of the electro-mechanical drive device is regulated through a control device. Regulation of this kind is known from DE 198 23 376 A1 where the semi-conductor circuit is provided with a semi-conductor bridging circuit. A semi-conductor bridging circuit generally uses four power directions of rotation.

If the power semi-conductors are arranged in a thermally poor conducting environment then the power semi-conductors have to be safeguarded against thermal overload. If the temperature in the power semi-conductor is too high then for example a surge breakthrough can lead to destruction of the structural element. In order to keep heating of the power semi-conductor as low as possible the switch-on resistance must be restricted for example through the parallel circuit connection of several transistors. For small switch-on resistances however correspondingly large transistor matrices are required, with the correspondingly large amounts of silicon which are necessary.

SUMMARY

The object of the invention is therefore to provide an electro-mechanical drive device which enables the power semi-conductor to be mounted in the gear housing without restricting the switch-on resistance of the power semi-conductor.

According to this, the electro-mechanical drive device has a gearing with a gear housing preferably of plastics, an electric motor mechanically connected to the gearing, a control device mounted in the gear housing and having at least one power semi-conductor for controlling the electric motor, and means thermally coupled to the power semi-conductor as a heat sink for diverting away waste heat from the power semi-conductor. The means which as a heat sink diverts the waste heat of the power semi-conductor away from said power semi-conductor are integrated in the gear housing.

Thus power semi-conductors with a larger switch-on resistance can be used since the waste heat arising at the switch-on resistance can be diverted away through the means acting as heat sink and a build-up of heat which close to the power semi-conductor could lead to the destruction of the semi-conductor structure is avoided. By integrating the means for diverting away the waste heat into the gear housing it is possible for the means to undertake further mechanical or thermal functions extending beyond their function as heat sink.

As power semi-conductor is used for example an HVMOS-transistor (high-voltage-metal-oxide-semiconductor). By power semi-conductors are also meant however all other types of power semi-conductors, such as for example bi-polar transistors or thyristors.

In an advantageous design of the invention the means and a housing of the power semi-conductor are fixed in force-locking connection to couple with one another. Through the force-locking connection contact is ensured between the power semi-conductor housing and the means so that a heat transistor resistance between the housing and the means is reduced for improved coupling. For the force-locking connection fastening elements are used such as for example screw or rivet connections, or more advantageously the means are spring-tensioned through a spring element, for example a leaf spring integrated in the gear housing.

For thermal coupling in a further design of the invention a heat conducting means is mounted between the means and a housing of the power semi-conductor. The heat conducting means is for example a heat conductor paste or a compressible solid body in order to compensate for unevenness and tolerances in the surface of the means or the housing.

In a further embodiment of the invention the gear housing has an opening for inserting the means and guide elements for positioning the means in an end position. The means are fixed in this end position through a fastening element, such as for example a detent catch. A detent catch can advantageously be integrated in the gear housing so that no additional separate fastening elements are required. In the end position the means contact, and are thus thermally coupled with, the power semi-conductor housing which is already in position. As an alternative the means is positioned in the end position and the contact is produced through positioning the power semi-conductor housing. The position of the means and the power semi-conductor housing relative to each other is determined through guide elements which can for example be formed integral with the gear housing.

An alternative further development proposes that the means are injection moulded, at least in part, in the gear housing whereby the gear housing is injection moulded as a plastics housing. Advantageously the control device with the injection moulded parts is additionally injection moulded with the means and previously the power semi-conductor is thermally coupled to the means for example by means of soldering. Parts of the means are not injection moulded for example in order to improve the dissipation of heat from the injection moulded plastics gear housing.

As an alternative to the further embodiment of the invention already mentioned the means are hermetically sealed in the gear housing against fluids and dust particles in order to prevent the inside of the housing from becoming soiled, without providing additional sealing for the means. To this end it is necessary to position the means on a wall of the gear housing, with the wall having thinner walls than the supporting parts of the gear housing in order to offer a lesser heat transfer resistance compared to the supporting parts of the gear housing. To this end the wall has a thickness of less than one millimeter for example.

In an advantageous further development of the invention the means have a further thermal coupling with a cooling element, for example the sheet metal plate of a door module or a metal frame of a vehicle seat on which the gear housing of the drive device is fixed. The means is in this case a heat conductor which is fixed on the cooling element, for example a support plate, and diverts the heat which is to be drawn off through a further thermal coupling to the cooling element. The heat conductor is advantageously made from aluminum, copper or another material having good heat conductive properties.

An advantageous design of the further development of the invention already mentioned has a mechanical connection between the means and the gear housing, and a fastening element is integrated in the means for fastening the gear housing on the support plate. A fastening element is for example an opening as a screw-in point or a stepped bolt with screw thread. The mechanical connection advantageously increases the stability of the gear housing.

In a further advantageous development of the invention a bearing for a gear element of the gearing is integrated in the means. The bearing is for example a bearing point shaped out of the means and on which a bearing bush slides, the bearing bush arranged for example on the shaft of the worm of a worm gear. In addition the means can be fastened for example by material connection in the gear housing in order to take up the forces acting on the bearing. The means can be for example metal or metal alloy on which the bearing bush slides. Furthermore the integration of the other types of bearings, such as hole bearings, support bearings or fixed bearings is also possible.

In one design of a further development of the invention the means has positioning elements for positioning the control device relative to the gear element or to a magnet fixed on the gear element. Stamped or bent surfaces or edges of the means are suitable for example as positioning elements. In order to ensure accurate positioning of the positioning elements relative to the gear elements the positioning elements are made, for example, stamped, with the bearing in the same work step.

A further development of the invention advantageously proposes that an opening of the gear housing is closed by the means. In this further development the means is a good heat conductive metal cooling lid which advantageously has cooling ribs for improved discharge of the heat to the surrounding air. The opening is sealed through a material connection between the cooling lid and the edge of the opening, the material connection preferably being provided by an adhesive to stick the cooling lid to the edge of the opening.

In a further advantageous development of the invention conductor panels which are insulated from each other are placed on the means to connect structural elements, for example the power semi-conductor, and interfaces of the control device. The interfaces of the control device are for example the interface with the electric motor contacts, with the functional units of the motor vehicle or with a sensor. The conductor panels are made for example through structuring a metal.

As a further possibility of integrating the means into the gear housing the means can be formed as part of a plug of a connector element of a wiring connection on the side of the drive device. The means can for this purpose be for example a metal plug-in collar which can be used at the same time as a screen guard for the signal leads.

For a process for manufacturing an electro-mechanical drive device for adjustment devices in a motor vehicle, more particularly a window lifter, a gear is used in a gear housing and an electric motor is mechanically connected to the gearing. A control device controlling the electric motor and having a power semi-conductor is mounted in the gear housing and a means acting as heat sink is integrated in the gear housing. At the same time as fitting the means as a heat sink the gear housing or as fitting the control device in the gear housing, the power semi-conductor is thermally coupled to the means acting as a heat sink through a contact between the heat sink means and the power semi-conductor.

BRIEF DESCRIPTION OF THE DRAWINGS

The invention will now be explained in further detail with reference to the embodiments shown in the drawings in which:

FIG. 3 shows an electro-mechanical drive device with a heat conductor;

FIG. 1 shows an embodiment of an electro-mechanical drive device of a window lifter. An electric motor A1, here for example a commutator motor A1, is connected mechanically to a gearing. The housing of the electric motor A1 is fixed to the gear housing A2 through a screw connection A12 between the electric motor A1 and the gear housing A2. The gear housing A2 is in this embodiment an injection moulded plastics housing, but alternatively a metal housing could be possible. The gear housing A2 has several screw points A20 through whose opening the gear housing A2 is screwed onto a support plate (not shown in FIG. 1).

Figure 1:
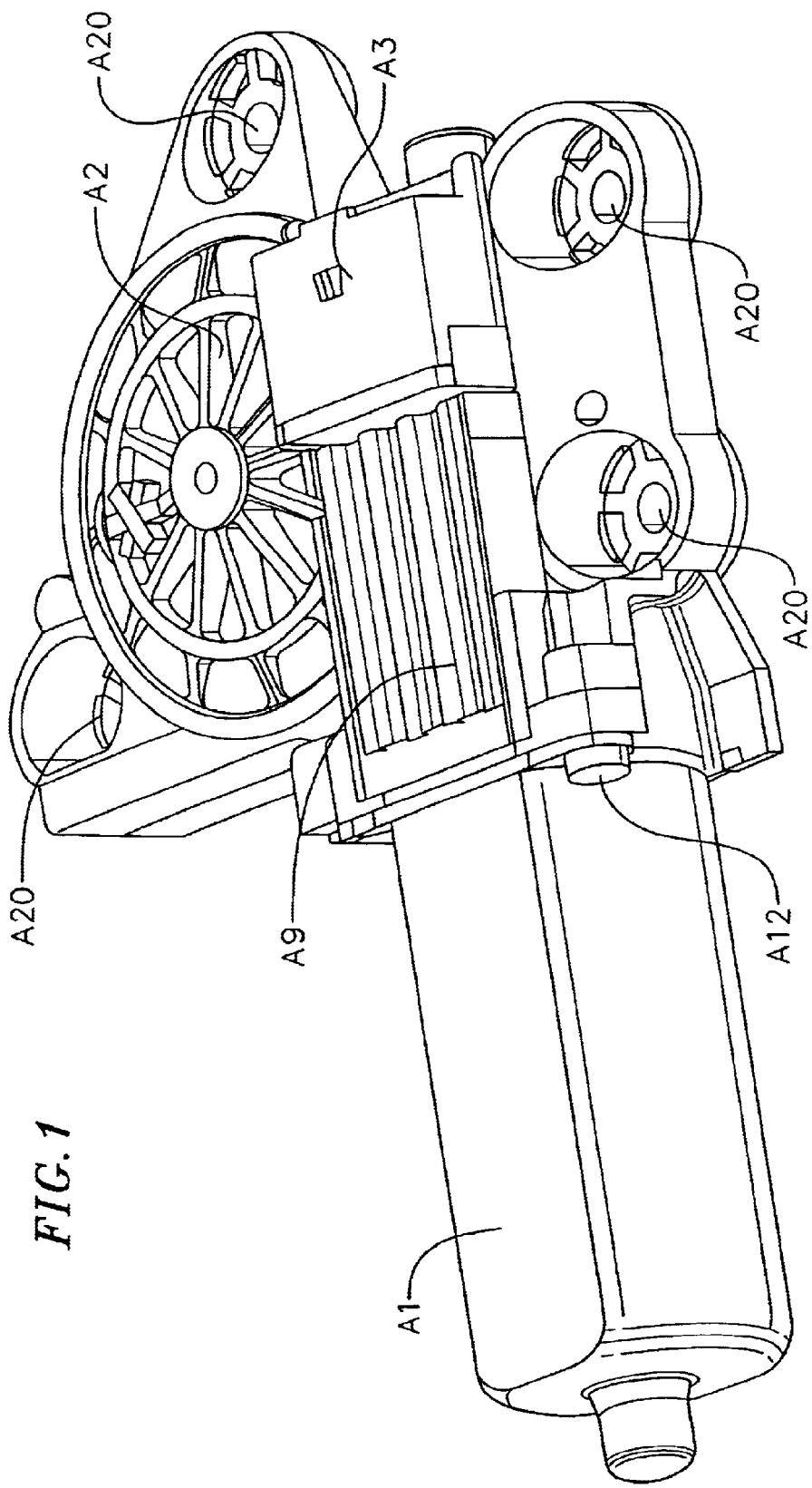
FIG. 1 shows an electro-mechanical drive device with a cooling lid.
Figure 1A:
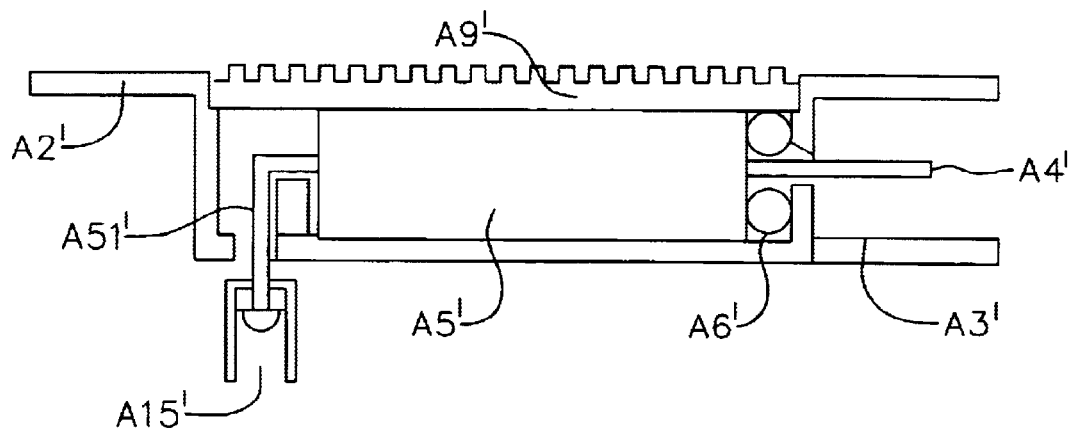
FIG. 1a shows a diagrammatic sectional view of the drive device.

An output pinion (not shown in FIG. 1) is guided through an opening in the support plate on which is fixed a cable drum (likewise not shown in FIG. 1) over which the cable of a window lifter is driven. A gearing, not shown in FIGS. 1 and 1a is mounted inside the gear housing A2. The gearing consists for example of a worm which is connected to the axle of the electric motor A1 and which drives a worm wheel connected to the output pinion.

For controlling the electric motor A1 a control device (not shown in FIG. 1) is integrated in the gear housing A2 behind a cooling lid A9. The control device is connected electrically or optically through a connector element of a wiring connection on the side of the drive device to further functional units (not shown) of the motor vehicle, for example to a door control device or to a battery. The connector element on the side of the drive device has a plug-in collar A3 and contact elements (not shown in FIG. 1). The plug-in collar A3 is formed integral with the injection moulded gear housing.

The control device is positioned through a side opening of the gear housing A2. When the control device is in position the motor contacts (not shown in FIG. 1) are in contact with the electric motor A1. In order to draw off the waste heat of the power semi-conductor, an HVMOS transistor, which is integrated in the control device, the said control device is thermally coupled to a means A9 acting as a heat sink. The means A9 is in this case a cooling lid A9 which has numerous cooling ribs. The cooling ribs enable a rapid discharge of the waste heat taken up by the cooling lid, to the surrounding air. The cooling lid A9 is welded by ultrasound welding into the opening of the gear housing A2 until good thermal coupling is ensured through contact between the cooling lid A9 and the control device.

FIG. 1a shows diagrammatically a sectional view of a drive device. The control device A5' is mounted in the gear housing A2' with the motor contacts A51' and the contact pins A4' of the connector element on the drive device side located through the formation of the gear housing A2', the plug-in collar A3' and the motor connections A15' so that the cooling lid A9' during insertion in the gear housing A2' makes a good thermal contact with the control device A5' and the cooling lid A9' has only to be fixed to the gear housing A2' through an adhesive material connection. The adhesive forms in a double function the sealing element to seal the inside of the gear housing A2'. The plug-in collar A3' is sealed by a rubber seal A6'.

Figure 2A:
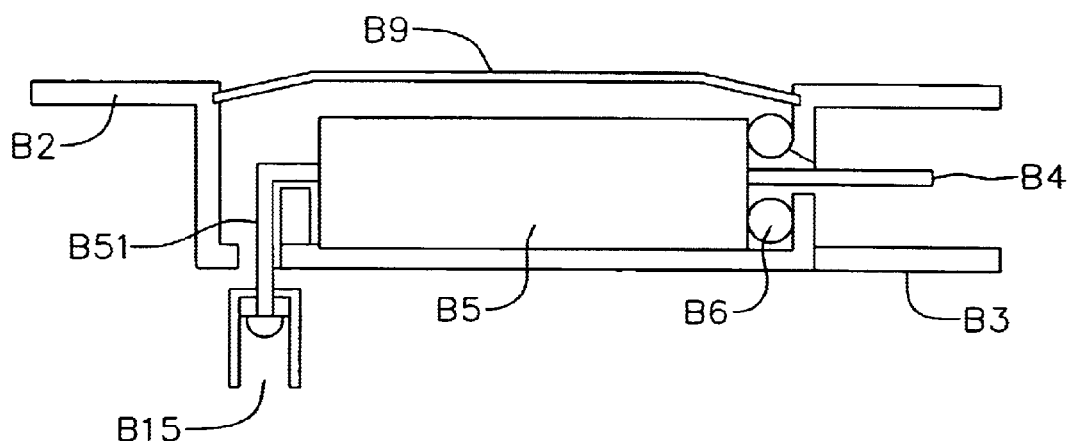
FIGS. 2a and 2b show diagrammatic side views of an embodiment of the means as a mechanically bi-state element.
Figure 2B:
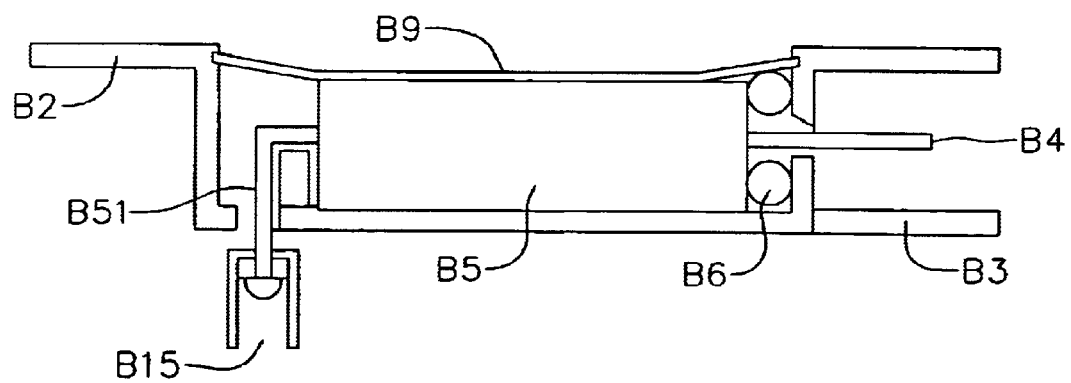

FIG. 2a and FIG. 2b show the means formed as a mechanically bi-stable cooling lid B9. In a first step the control device B5 is positioned, with the contact pins B4 and the motor contacts B51 as well as a sealing rubber B6 for sealing the plug-in collar B3, in the plug-in collar B3, motor connections B15, and the gear housing B2. In a second step the mechanically bi-stable cooling lid B9 is fixed in the gear housing B2. In the third step the mechanically bi-stable cooling lid B9 is moved from a first mechanically stable state into a second mechanically stable state in order to thermally couple the means B9 through a contact in the second mechanically stable state to the housing (B5) of the power semi-conductor.

FIG. 3 shows an electro-mechanical drive device with a heat conductor C9. The heat conductor C9 is in this case formed as a cooling angle. The drive device in FIG. 3 is fixed on a support plate analogous with the drive device of FIG. 1. The support plate is often of a metal to ensure the mechanical stability of the window lifter. The object of the heat conductor C9 is consequently to divert the waste heat from the power semi-conductor to the metal support plate.

To this end the heat conductor C9 has two thermal couplings, on the one hand to the power semi-conductor integrated in the control device C5, and on the other to the support plate, which is connected to the gear housing C2 through screw in points C20. The electric motor C1 drives a worm wheel connected to an output pinion C29 and is connected to the gear housing C2 through a motor screw connection C12. FIG. 3 shows an insert solution for integrating the heat conductor C9 in the gear housing C2. The heat conductor C9 is already thermally coupled to the control device C5 prior to insertion, with the heat conductor C9 being connected to the control device C5 through material connection, for example soldering. In addition a suppressor element C53, here for example an electrolyte capacitor C53, is attached, for example soldered on to the control device C5.

At the point where the thermal coupling between the heat conductor C9 and the support plate requires the smallest possible thermal resistance, the wall C92 of the gear housing C2 is made correspondingly thin, less than one millimeter.

Figure 3A:
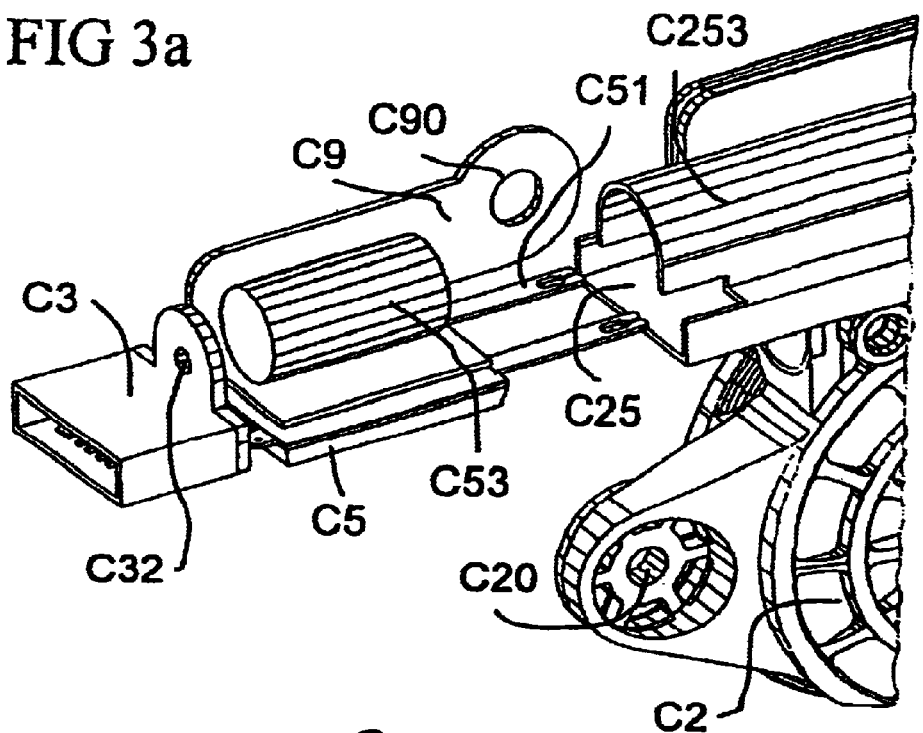
FIGS. 3a and 3b show detailed views of the electro-mechanical drive device with a heat conductor.
Figure 3B:
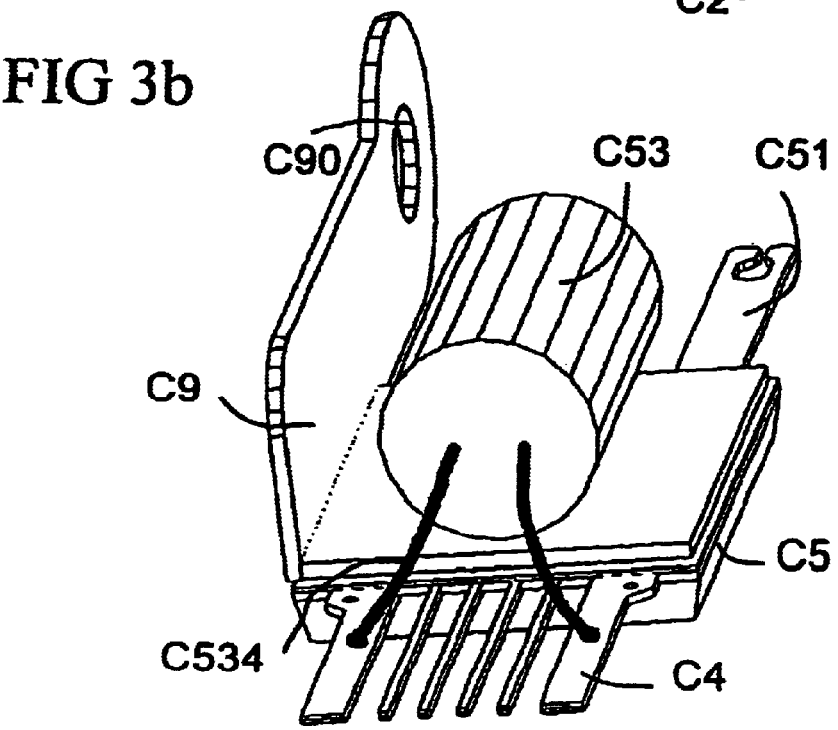

FIGS. 3a and 3b show detailed views of the electro-mechanical drive device. The control device C5 has the motor contacts C51 for contacting the electric motor C1 and the contact pins C4 for a plug. An electrolyte capacitor C53, having a housing C253, is soldered by its two connectors C534 to the contact pins C4. In order to thermally couple the power semi-conductor which is integrated in the control device C5 to the cooling angle C9 which is formed as a heat conductor C9, the cooling angle C9 is connected with material engagement to the housing of the control device C5. This unit comprising control device C5, suppressor element C53 and cooling angle C9 is inserted in the opening C25 of the gear housing C2 and then a plug-in collar C3 with a casting opening C32 is fitted on and the unit is cast in the gear housing C2 through a casting mass.

For additional fixing, a screw opening is integrated as a fastening element in the cooling angle C9. The drive device is screwed through the screw opening to the support plate through a screw. The metal of the cooling angle C9 thereby additionally stabilises the gear housing C2. All other types of fastening elements, for example threaded bolts, can also be integrated as fastening element C90.

Figure 4:
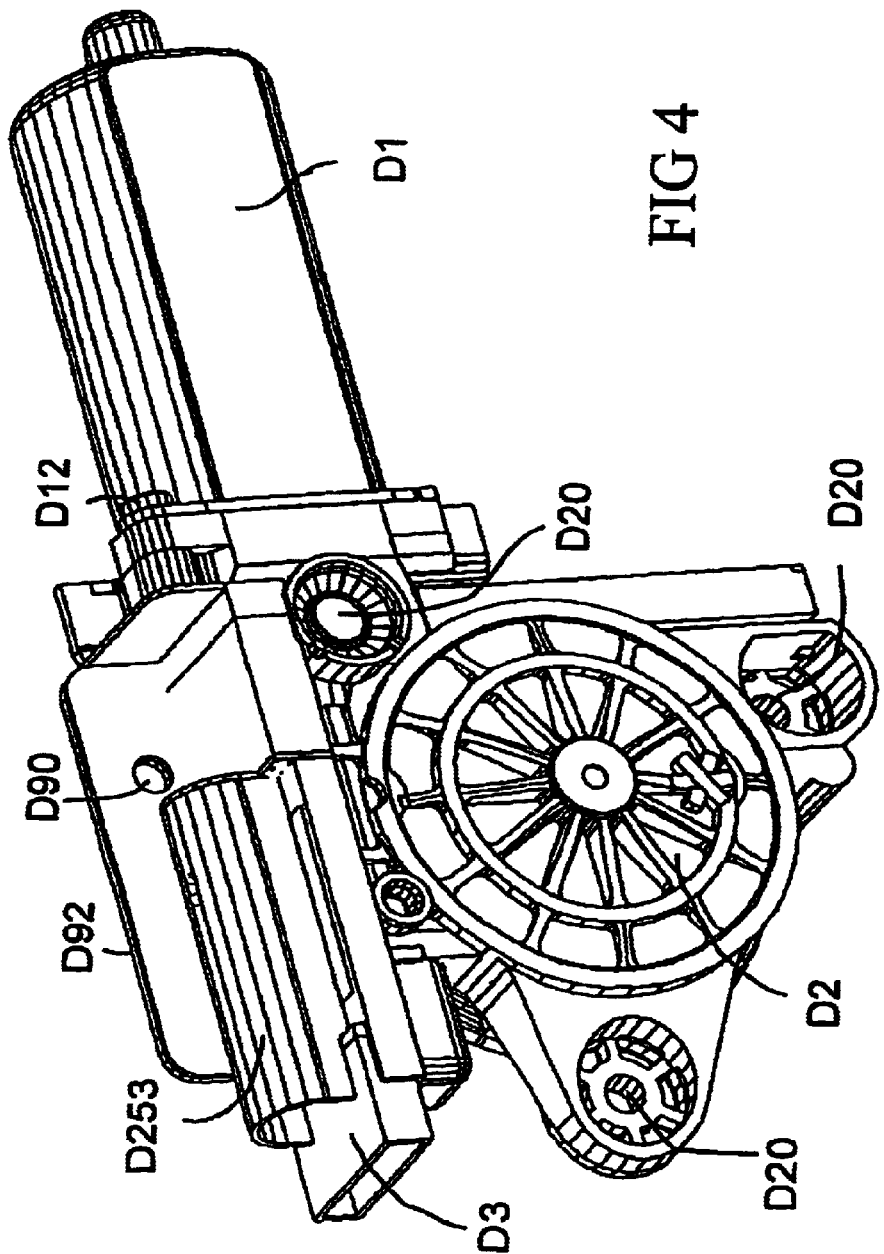
FIG. 4 shows an electro-mechanical drive device with an injected heat conductor.
Figure 4A:
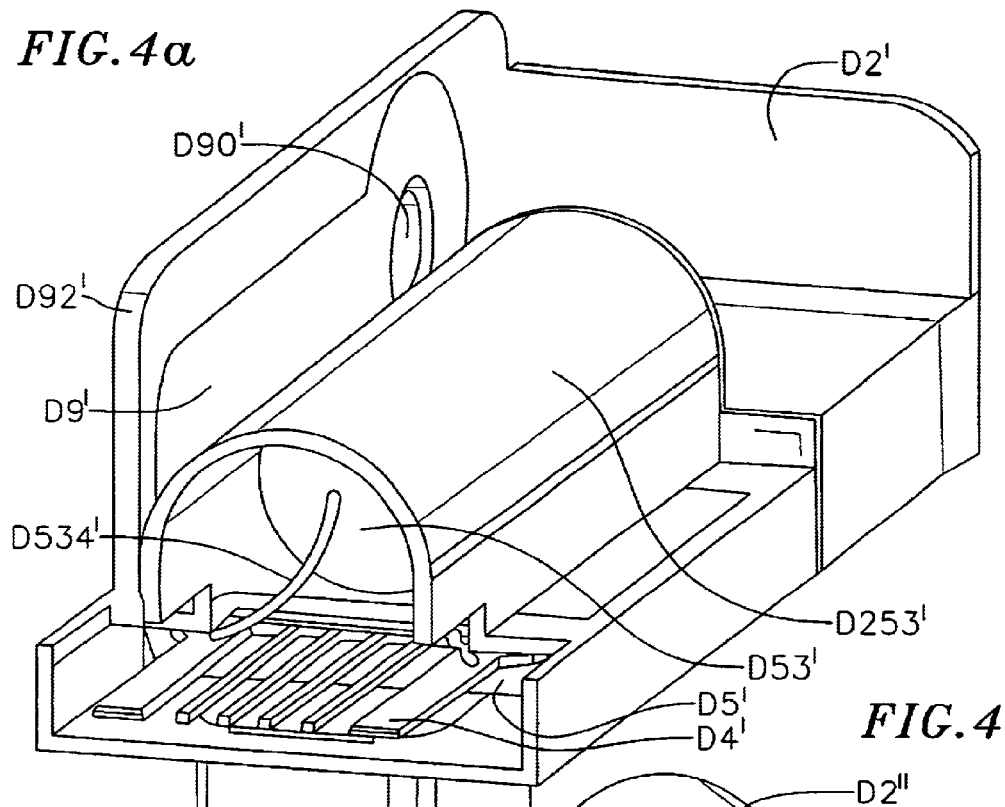
FIGS. 4a and 4b show views of different embodiments of an electromechanical drive device with a heat conductor.
Figure 4B:
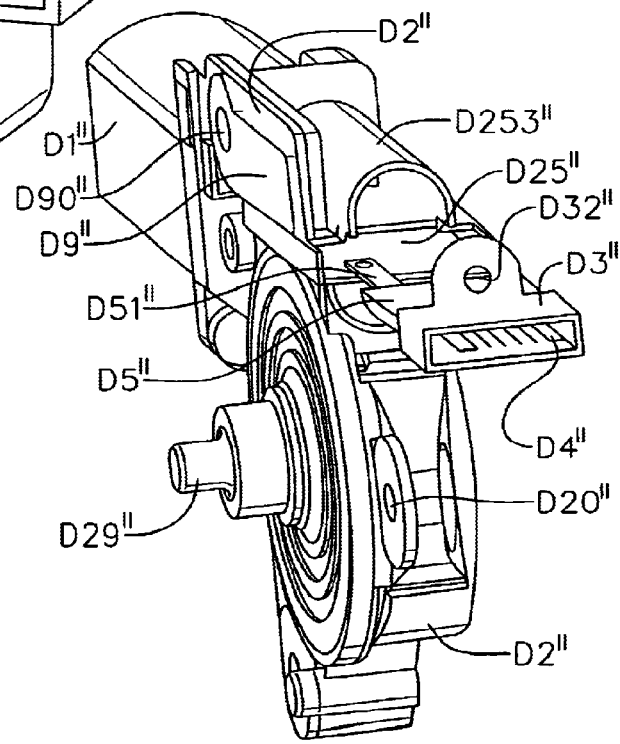

FIG. 4 shows an electromechanical drive device which is very similar to the drive device of FIG. 3. In the case of FIG. 4 the gear housing D2, which is connected to electric motor D1 by a motor screw connection D12, is formed in one piece of plastics without an insert for the control electronics with the plug-in collar D3. Gear housing D2 is also connected to a support plate by screw-in openings D20. The thin wall of the gear housing D92 has a fastening element D90. The electrolyte capacitor housing D253 is located proximate to the plug-in collar D3. FIG. 4a and FIG. 4b show two possibilities of the thermal coupling between the cooling angle D9', D9" and the support plate. In FIG. 4a the cooling angle D9' is injected with the control device D5' in the gear housing D2'. The electrolyte capacitor D53' is subsequently fitted into the housing D253' and the connections D534' of the electrolyte capacitor D53' are soldered to the contact pins D4'. The electrolyte capacitor D53' is alternatively contacted with the plug contacts. The cooling angle D9', with a fastening element D90', is injected into a thin wall D92' of the gear housing.

In FIG. 4b, the cooling angle D9" on the side of the support plate is not injection moulded with the plastics of the gear housing D2". The side facing the housing D253" of the electrolyte capacitor (see FIG. 4a as D53') is supported by the plastics of the gear housing D2" in order to increase the mechanical stability of the screw-in point D90" integrated in the cooling angle D9". The control device D5" is pushed into the opening D25" of the gear housing D2" and is positioned by the cooling angle D9" as a guide element. The plug-in collar D3", contact elements D4", screw-in points D20", motor contacts D51", control device D5", and casting opening D32" correspond to those described in relation to FIGS. 3a and 3b.

Figure 5:
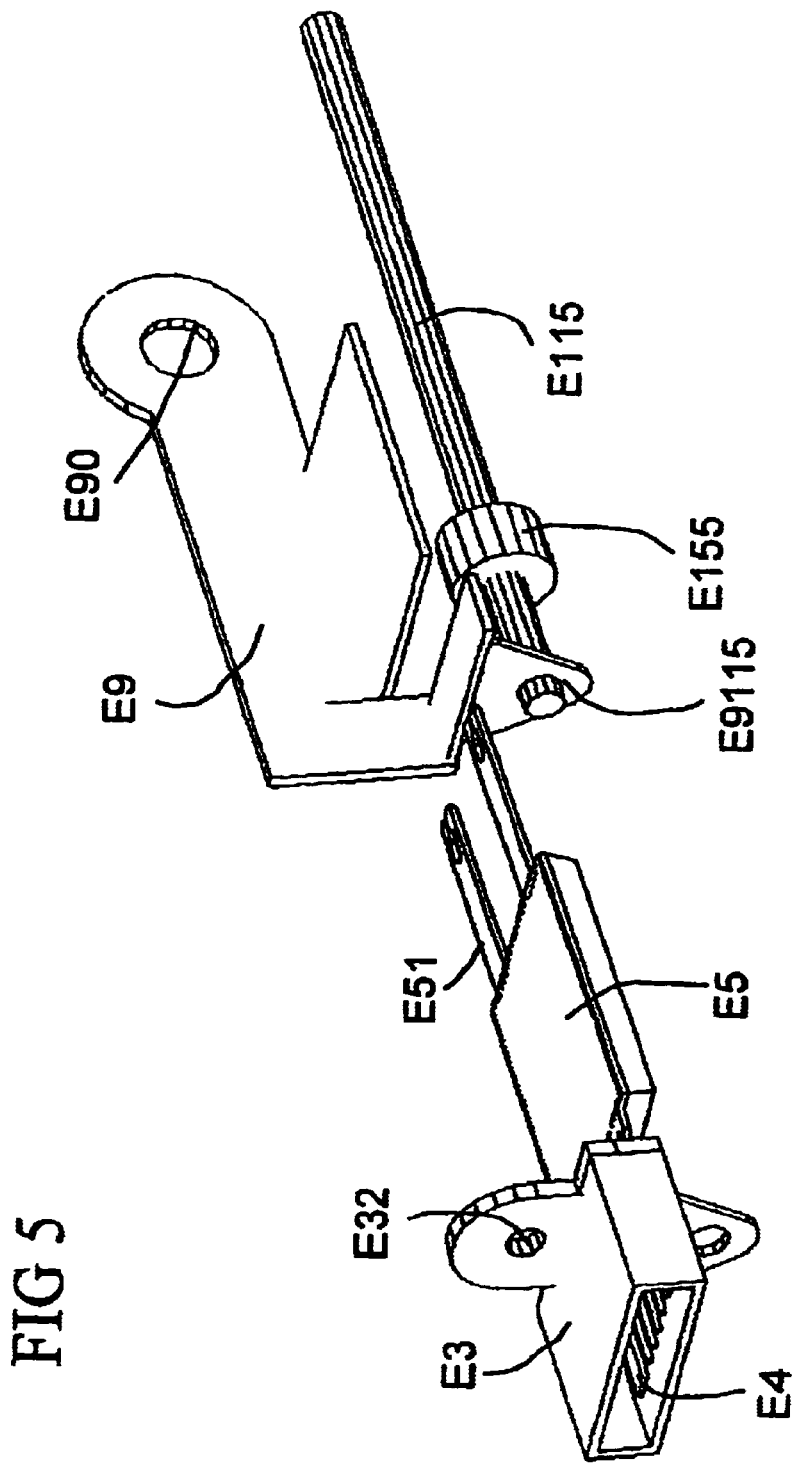
FIG. 5 shows the heat conductor also functioning as a bearing of the worm shaft.

FIG. 5 shows the integration of a bearing E9115 in a cooling angle E9. The shaft E115 of a worm (not shown in FIG. 5) is mounted with sliding action in the bearing E9115, in this case a bearing hole E9115. In order to ensure a fixed position in the gear housing (analogous to D2" in FIG. 4b) the cooling angle E9 is injection moulded at least in part in the gear housing (D2"). The alloy of the cooling angle E9 is matched with the alloy of the shaft E115 in order to optimise the sliding properties.

A Hall magnet E155 is mounted on the shaft E115 positioned relative to a surface of the cooling angle E9. The control device E5 is inserted and positioned between the Hall magnet E155 and the surface of the cooling angle E9 so that thermal coupling is achieved through good contact with the surface of the cooling angle E9 and accurate positioning relative to the Hall magnet E155. The interaction of the Hall sensors integrated in the control device E5 in respect of the Hall magnet is optimized by the accurate positioning. In order that the control device E5 is in the optimum position accordingly, surfaces are provided in the cooling angle E9 acting as guide elements for guiding the control device E5 which is to be inserted. The plug-in collar E3, contact elements E4, motor contacts E51, fastening element E90, and casting opening E32 correspond to those described in relation to FIGS. 3a and 3b.

What is claimed is:

1. An electro-mechanical drive device for an adjustment device of a motor vehicle, comprising:
    a gearing with a gear housing;
    an electric motor mechanically connected to the gearing;
    a control device mounted in the gearing housing and having at least one power semi-conductor for controlling the electric motor; and
    means thermally coupled to the at least one power semi-conductor as a heat sink for drawing off waste heat from the at least one power semi-conductor, wherein the means is integrated in the gear housing.

2. An electro-mechanical drive device according to claim 1, wherein for the purpose of coupling, the means and a power semi-conductor housing are fixed with force-locking engagement against one another in order to reduce a heat transfer resistance.

3. An electro-mechanical drive device according to claim 2, wherein for the force-locking engagement, the means is spring-tensioned through a spring element against the power semi-conductor housing.

4. An electro-mechanical drive device according to claim 1, wherein a heat conducting means is mounted for thermal coupling between the means and a power semi-conductor housing.

5. An electro-mechanical drive device according to claim 1, wherein the gear housing has an opening for inserting the means and guide elements for positioning the means in an end position, and the means is lockable in the end position.

6. An electro-mechanical drive device according to claim 1, wherein the means is injection moulded at least in part in an injection moulded plastics housing of the gearing.

7. An electro-mechanical drive device according to claim 1, wherein the gear housing has supporting parts, the means is hermetically sealed in the gear housing against fluids and dust particles, and the means is positioned against a wall of the gear housing wherein the wall is thinner than the supporting parts of the gear housing.

8. An electro-mechanical drive device according to claim 1, wherein the means acts as a heat conductor and is coupled with a cooling element to discharge the waste heat diverted away from the at least one power semi-conductor to the cooling element, and the cooling element is a support plate on which the gear housing is fixed.

9. An electro-mechanical drive device according to claim 8, further comprising a mechanical connection between the heat conductor and the gear housing, and a fastening element integrated in the heat conductor for fixing the gear housing on the cooling element.

10. An electro-mechanical drive device according to claim 1, wherein a bearing for a gear element of the gearing is integrated in the means.

11. An electro-mechanical drive device according to claim 10, wherein the means has positioning elements for positioning the control device relative to at least one of the gear element and a magnet fixed on the gear element.

12. An electro-mechanical drive device according to claim 1, wherein the means is a cooling lid, an opening of the gear housing is closed by the cooling lid and the cooling lid has cooling ribs.

13. An electro-mechanical drive device according to claim 12, wherein the opening is sealed by a material connection, comprising one of ultra sound welding of the cooling lid to an edge of the opening, and sticking of the cooling lid to an edge of the opening through an adhesive between the cooling lid and an edge of the opening.

14. An electro-mechanical drive device according to claim 1, wherein conductor panels which are insulated from each other are arranged on the means to connect at least one structural element and at least one interface of the control device.

15. An electro-mechanical drive device according to claim 14, wherein the conductor panels have contact elements which can be contacted during fitting of the means.

16. A hermetically sealed gear housing of an electro-mechanical drive device of an adjustment device for motor vehicles for diverting waste heat from a power semi-conductor which is integrated in a control device in the gear housing wherein at least a part of the gear housing is thermally coupled to the power semi-conductor by a thermal coupling to draw off the waste heat, and the thermal coupling is connected to the gear housing such that the stability of the gear housing is increased.

17. An electro-mechanical drive device according to claim 1, wherein the means is in physical contact with the power semi-conductor.

18. An electro-mechanical drive device for an adjustment device of a motor vehicle, comprising:
    a gearing with a gear housing;
    an electric motor mechanically connected to the gearing;
    a control device mounted in the gearing housing and having at least one power semi-conductor for controlling the electric motor; and
    means thermally coupled to the at least one power semi-conductor as a heat sink for drawing off waste heat from the at least one power semi-conductor, wherein the means is integrated in the gear housing,
    wherein the gear housing has supporting parts, the means is hermetically sealed in the gear housing against fluids and dust particles, and the means is positioned against a wall of the gear housing wherein the wall is thinner than the supporting parts of the gear housing.

19. An electro-mechanical drive device for an adjustment device of a motor vehicle, comprising:

a gearing with a gear housing;

an electric motor mechanically connected to the gearing;

a control device mounted in the gearing housing and having at least one power semi-conductor for controlling the electric motor; and means thermally coupled to the at least one power semi-conductor as a heat sink for drawing off waste heat from the at least one power semi-conductor, wherein the means is integrated in the gear housing, wherein the means is a cooling lid, an opening of the gear housing is closed by the cooling lid and the cooling lid has cooling ribs.

20. An electro-mechanical drive device according to claim 18, wherein the opening is sealed by a material connection, comprising one of ultra sound welding of the cooling lid to an edge of the opening, and sticking of the cooling lid to an edge of the opening through an adhesive between the cooling lid and an edge of the opening.

* * * * *

UNITED STATES PATENT AND TRADEMARK OFFICE
CERTIFICATE OF CORRECTION

PATENT NO. : 6,917,129 B2
DATED : July 12, 2005
INVENTOR(S) : Becker et al.

It is certified that error appears in the above-identified patent and that said Letters Patent is hereby corrected as shown below:

Title page,
Item [75], Inventors, delete "Reiner Kurzendoarfer, Coburg", insert -- Reiner Kurzendoerfer, Untermerzbach --; delete "Karl-Heinz Rosenthal, Karlsbad", insert -- Karl-Heinz Rosenthal, Baunach --.
Item [56], References Cited, U.S. PATENT DOCUMENTS,
"3,617,786 A" reference, delete "Stieper", insert -- Stielper --;
"4,712,030 A" reference, delete "Lakin", insert -- Lakin et al. --;
"5,315,194 A" reference, delete "Bruasasco", insert -- Brusasco et al. --; and
"5,923,094 A" reference, delete "Seeberger", insert -- Seeberger et al. --.
OTHER PUBLICATIONS, insert
-- International Search Report of PCT/DE01/01597, Mailed August 23, 2001 --.
Item [57], ABSTRACT,
Line 5, delete "gearing housing", insert -- gear housing --.

Column 7,
Line 41, delete "gearing housing", insert -- gear housing --.
Line 44, delete "gear housing", insert -- gear housing,
wherein the means is connected to or located within the gear housing such that the stability of the gear housing is increased --.
Line 52, delete "through a spring element".

Column 8,
Lines 14-15, delete "a mechanical connection between the heat conductor and the gear housing, and".
Line 59, delete "gearing housing", insert -- gear housing --.

UNITED STATES PATENT AND TRADEMARK OFFICE
CERTIFICATE OF CORRECTION

PATENT NO. : 6,917,129 B2
DATED : July 12, 2005
INVENTOR(S) : Becker et al.

It is certified that error appears in the above-identified patent and that said Letters Patent is hereby corrected as shown below:

Column 9,
Line 8, delete "gearing housing", insert -- gear housing --.

Signed and Sealed this

Thirtieth Day of May, 2006

JON W. DUDAS
*Director of the United States Patent and Trademark Office*